United States Patent Office 3,478,103
Patented Nov. 11, 1969

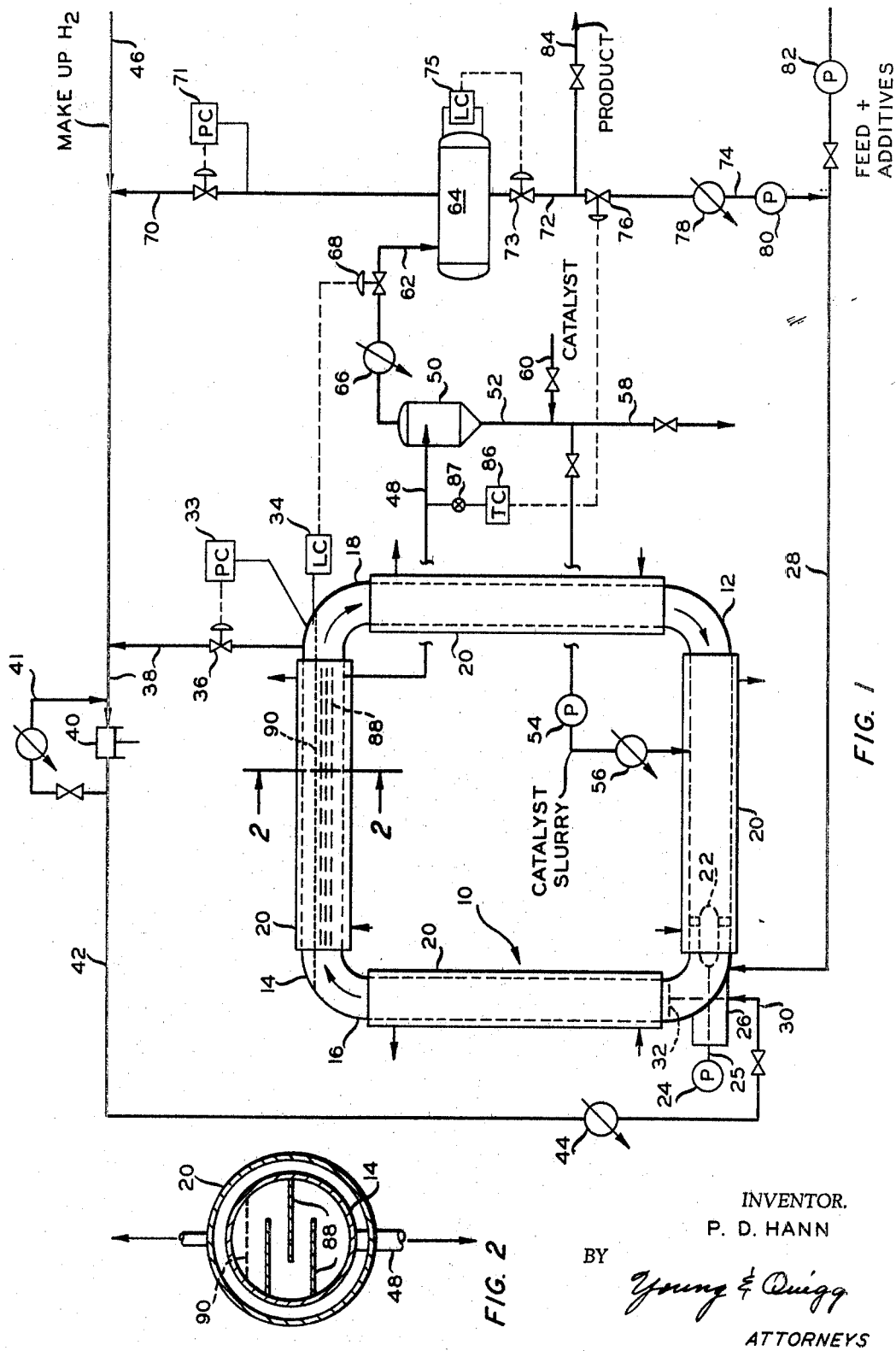

3,478,103
PREPARATION OF HEXAMETHYLENE DIAMINE
Paul D. Hann, Bartlesville, Okla., assignor to Phillips Petroleum Company, a corporation of Delaware
Filed Dec. 19, 1966, Ser. No. 602,621
Int. Cl. C07c *87/14*
U.S. Cl. 260—583          2 Claims

ABSTRACT OF THE DISCLOSURE

In catalytically hydrogenating an unsaturated organic compound in liquid phase using a slurry of particulate catalyst, a liquid level is maintained in the reaction effluent with a hydrogen vapor phase thereabove, withdrawal of liquid effluent is controlled to maintain the desired liquid level, the major portion of exothermic heat is removed by indirect heat exchange thru the wall of the reactor, and close temperature control of the reaction is effected by cooling a portion of the hydrogenated product and recycling same to the reactor, the rate of recycle being controlled in response to the sensed temperature of the reaction effluent.

---

Figure 3:
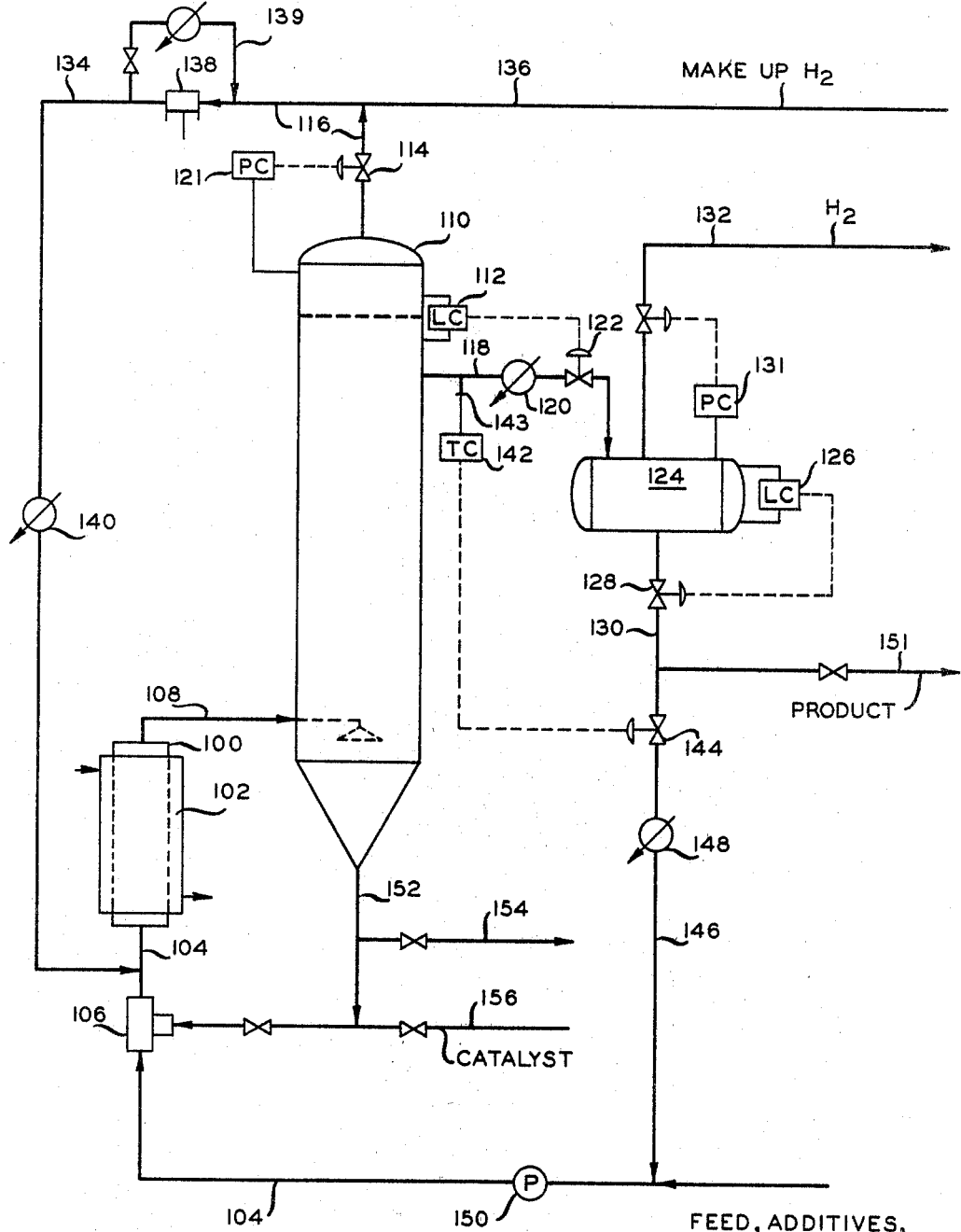

This invention relates to a hydrogenation process and to an arrangement of apparatus and controls for effecting the hydrogenation of hydrogenatable organic compounds in liquid phase.

Various types of oranic liquids are hydrogenated in liquid phase in the presence of hydrogenation catalysts and under substantial hydrogen pressure. Such hydrogenation processes are exothermic and require substantial heat removal to control the reaction temperature at a desired level. Controlling the temperature by indirect heat exchange with a coolant in tubes or coils within the reactor or by circulating the coolant thru a jacket around the reactor are expedients conventionally utilized but have not been found to be effective in providing close and immediate control of the hydrogenation temperature within the reactor. Other problems involving recovery and recycling of hydrogen and catalysts from the hydrogenation effluent have been encountered.

This invention is concerned with an improved process and arrangement of apparatus for effecting hydrogenation of organic compounds in liquid phase under substantial super-atmospheric hydrogen pressure which provides improved control of the hydrogenation process.

Accordingly, it is an object of the invention to provide an improved process for hydrogenating hydrogenatable organic compounds in liquid phase. Another object is to provide an improved process for controlling the hydrogenation of hydrogenatable organic compounds in liquid phase and, particularly, the hydrogenation of adiponitrile or ε-aminocapronitrile to hexamethylenediamine. A further object is to provide an improved arrangement of apparatus and controls for effecting liquid phase hydrogenation of organic compounds under substantial super-atmospheric hydrogen pressure. Other objects of the invention will become apparent to one skilled in the art upon consideration of the accompanying disclosure.

One embodiment of the invention comprises an upright loop reactor having an impeller therein for circulating reactants and catalysts thru the loop with a liquid level controller for maintaining a liquid level in an upper section of the loop to provide a vapor space for withdrawal of hydrogen by operating a motor valve in the hydrogen withdrawal line in response to the liquid level controller. The liquid hydrogenated product is withdrawn from the loop along with solid particulate catalyst suspended therein and is passed thru a liquid-solid separator, such as a cyclone separator, to recover an overhead liquid product stream and a bottoms stream of catalyst in the form of a slurry in liquid hydrogenated product. The system is maintained under substantially the pressure of the reactor up to this point in the flow and the major portion of the recovered catalyst slurry is pumped back to the reactor along with make-up catalyst added to maintain catalyst activity and selectivity. The overhead effluent product stream from the separator is passed thru a cooler and then thru an expansion valve into a phase separator from which hydrogen is removed as an overhead stream and liquid hydrogenated product substantially free of hydrogen is removed as a bottoms stream. A portion of this bottoms stream is recovered as product of the process and another substantial proportion thereof is passed thru a cooler and pumped into the reactor directly or thru the feed line for the hydrogenatable organic liquid. The recycled product stream is cooled to a temperature substantially below the selected hydrogenation temperature and the flow of this stream into the reactor is controlled so as to control the hydrogenation temperature by sensing the temperature of the effluent product from the reactor and regulating the flow of the recycled product stream in response to the sensed temperature, increasing the flow as the sensed temperature rises from the selected hydrogenation temperature, and vice versa. The recycled hydrogen, along with make-up hydrogen for replacing the hydrogen used in the hydrogenation step, is pumped, e.g. by a gas compressor, into the reactor just downstream of the impeller to avoid cavitation. Another feature of the invention lies in the provision of stabilizer means, such as spaced horizontal plates in the upper horizontal arm of the loop reactor, to prevent vibration or uncontrolled fluctuation of the liquid at the gas-liquid interface.

Another embodiment of the invention comprises a jacketed reactor which is maintained liquid-full and is connected by flow conduit for reactor hydrogenated effluent containing dissolved hydrogen under substantial hydrogen pressure with an upright gas-liquid separator. This separator is provided with a liquid-level control for maintaining a liquid level in the upper section thereof by withdrawing hydrogen from the vapor above said liquid level thru a motor valve under the control of the liquid-level controller. The solid particulate catalyst passing into the separator collects in the bottom thereof and is withdrawn and recycled into the reactor thru an eductor in the feed line for organic liquid leading into the reactor. A liquid hydrogenated product stream is withdrawn from an upper section of the reactor below the liquid level, passed thru a cooler and a downstream expansion valve into a phase separator from which an overhead stream of hydrogen is recovered (which may be recycled to the reactor), and a bottoms liquid product stream is recovered. A portion of this recovered liquid product stream is cooled and recycled to the reactor under the same conditions or control as described above, utilizing the temperature of the effluent product stream from the separator or from the reactor to control a motor valve in the product recycle line.

The invention is applicable to the hydrogenation (meaning hydrogenation and/or hydrogenalysis) of any catalytically hydrogenatable organic compound. No attempt is made here to enumerate all of the compounds which are amenable to liquid phase (slurry) catalytic hydrogenation but a representative list of compounds includes: various functional groups such as alkenes, alkynes, aldehydes, ketones, halogen compounds, nitriles, oximes, aldimines and ketimines, hydrazones, semicarbazones, ketazines, hydrazo and azo compounds, nitro compounds, aromatic nuclei, alcohols, ethers, acetals, acid anhydrides and imides, esters and lactones, carbon-carbon linkages, amides (to amines), esters (to alcohols) organometallic compounds, etc.

Any solid particulate hydrogenation catalyst may be utilized in the process, the particular catalyst to be used being selected with reference to the particular feed to be hydrogenated. The illustrative catalysts include finely divided nickel; cobalt; nickel mixed with cobalt; platinum-type; palladium-type; etc., either alone or deposited upon a suitable carrier.

The invention is particularly adapted to the hydrogenation of adiponitrile or ε-aminocapronitrile to produce hexamethylenediamine utilizing Raney type catalysts such as nickel, cobalt, or nickel mixed with chromium. These catalysts are utilized in finely comminuted form, the particle size being selected to maintain good suspension in the circulating liquid reactant without being unduly fine to such an extent that settling in the separation zone is not effective, the particle size depends somewhat upon the density of the catalyst and reaction and operation conditions, including whether settling means, cyclone separation means, or powered centrifuging means are employed, but the longest dimension will generally be in the range of about 0.001 inch up to about 0.25 inch.

The temperature of the hydrogenation reaction will depend upon the specific material being hydrogenated and hydrogenation temperatures conventional in the art for the different compounds are to be used in the process. In hydrogenating adiponitrile or ε-aminocapronitrile, the temperature is preferably maintained in the range of about 160 to 170° F. but temperatures of about 150 to 180° F. or higher may be utilized as long as appropriate pressure is used to maintain liquid phase. Hydrogen pressure in the system upstream of the expansion valve is maintained in the range of about 40 to 80 atmospheres, preferably 50 to 60 atmospheres. It is feasible to dilute the reactant organic liquid with suitable relatively inert liquid diluent.

From 50 to 75 percent or more of the catalyst is recycled along with a small amount of fresh make-up catalyst usually in the range of about 0.5 to 3 weight percent, based upon the total amount of hydrogenatable feed introduced to the reactor. The specific reaction conditions to be employed are conventional in the art and do not comprise the novelty in the invention.

A more complete understanding of the invention may be had by reference to the accompanying schematic drawing of which FIGURE 1 is a flow thru a preferred arrangement of apparatus for effecting hydrogenation; FIGURE 2 is a cross section taken on the line 2—2 of FIGURE 1; and FIGURE 3 is a flow of another arrangement of apparatus in which the invention is effected.

Referring to FIGURE 1, a loop reactor 10 comprises horizontal arms 12 and 14 continuous with vertical arms 16 and 18, each of which is provided with a cooling jacket 20. An impeller 22 in the arm 12 is operated by motor 24 thru a shaft 25 extending thru a sealed housing 26. A feed line 28 for liquid feed and a hydrogen feed line 30 lead into the reactor just downstream of impeller 22. A sparger 32 on the end of feed line 30 disperses hydrogen in the liquid flowing thru the loop under the impetus of impeller 22. A pressure controller 33 maintains a suitable pressure in reactor arm 14. This controller connects with motor valve 36 in effluent hydrogen line 38 and releases hydrogen from the vapor space in the upper portion of arm 14 to maintain the desired pressure. Hydrogen line 38 leads into compressor 40 which delivers compressed hydrogen to recycle line 42 for introduction of hydrogen to feed line 30. A cooler 44 is positioned in line 42 for reducing the temperature of the compressed hydrogen. A line 46 for make-up hydrogen connects with the line 38 upstream of compressor 40.

An effluent hydrogenated product line 48 connects with the interior of the reactor arm 14 and leads into a suitable separator 50 for separating catalyst from liquid product. This separator may be a cyclone separator, as shown, or any other suitable piece of equipment which separates a concentrated slurry of particulate catalyst in hydrogenated product. This separator 50 operates liquid-full. A catalyst recycle line 52 connects with separator 50 and leads into arm 12 of the reactor upstream of impeller 22 and is provided with a pump 54 and a cooler 56. Line 58 connects with line 52 for withdrawing a selected portion of the catalyst slurry. A catalyst make-up line 60 also connects with catalyst recycle line 52 for introducing a selected amount of make-up catalyst. The make-up catalyst can be added with the feed and additives by way of pump 82.

An overhead line 62 connects the overhead outlet of separator 50 with a phase separator 64. A cooler 66 and a controlled expansion valve 68 downstream thereof are positioned in line 62. Level controller 34 maintains reactor liquid at a preselected level by controlling valve 68. Pressure control unit 71 maintains the preselected pressure in 64 by controlling the valve in line 70. Overhead line 70 for hydrogen leads from separator 64 to hydrogen line 38 for recycle thru compressor 40 and line 42. The compressor has the conventional recycle loop 41. A bottoms product line 72 connects with a product recycle line 74 leading into feed line 28 and is provided with a motor valve 76, a cooler 78, and a pump 80. Line 74 connects with line 28 downstream of pump 82. A product take-off line 84 connects with line 72 for withdrawing that portion of the liquid hydrogenated product not recycled to the reactor thru line 74. This stream may be filtered (not shown) to remove any traces of catalyst, and then distilled to recover the desired product.

The major proportion of the exothermic heat of the hydrogenation reaction is removed by indirect heat exchange in jackets 20 thru which a coolant, such as water, is passed thru the inlet and outlet lines shown. To provide final and precise temperature control, the amount of cooled hydrogenated product recycled thru line 74 is regulated by sensing the temperature of the hydrogenated product in line 48 by means of temperature controller instrument 86 which is connected with a temperature sensing and transmitting device 87 and is in operative control of motor valve 76. If the temperature of the product in line 48 is above a desired temperature, valve 76 is opened so as to pass more cooled liquid product to the reactor and compensate for the increase in temperature. If the sensed temperature decreases from the selected hydrogenation temperature, valve 76 is partially closed to cut back on the amount of recycle. This temperature control, in combination with the jacket heat exchange, is highly efficient and effective in controlling the hydrogenation temperature.

Referring to FIGURE 2, a series of horizontal plates 88, overlapping and extending only a portion of the way across the reactor arm 14, extend longitudinally of the arm (as shown in FIGURE 1). These plates prevent vibration or rapid fluctuation of the liquid level 90 maintained by liquid-level controller 34. A perforate plate extending longitudinally of the reactor positioned horizontally just below the interface level 90 may also be utilized to prevent sudden fluctuation and vibration of the liquid level due to escape of hydrogen gas.

Referring to FIGURE 3, a cylindrical reactor 100 is provided with a jacket 102 for circulation of coolant therethru. A feed line 104 connects with the bottom of the reactor and is provided with an eductor 106. An overhead effluent line 108 leads into an upright separator 110 in the form of a cylindrical tank which is provided with a pressure controller 121 in operative control of a motor valve 114 in hydrogen effluent line 116. An effluent product line 118 connects with the separator below the liquid level and is provided with a cooler 120 and a downstream controlled expansion valve 122. Level controller 112 maintains a preselected liquid level in the reactor by controlling valve 122. Line 118 connects with a phase separator 124 which is provided with a liquid level controller 126 for maintaining a selected liquid level in this separator by passing liquid thru motor valve 128 in product take-off line 130. An overhead line 132 withdraws hydrogen from the vapor space in tank 124. Pressure control system 131 maintains a preselected pressure in separator 124 by controlling the valve in line 132. The withdrawn hydrogen may be combined with that in line 116, if desired, and passed to recycle line 134 along with fresh make-up hydrogen from line 136 under the impetus of compressor 138 thru cooler 140 into feed line 104 to provide the required hydrogen pressure in reactor 100. The compressor has the conventional recycle loop 139.

In the system described, the final temperature control is effected in a manner similar to that utilized in the apparatus of FIGURE 1. The temperature of the product in line 118 is sensed by the usual sensing instrument and a signal is transmitted by transmitter 143 to temperature controller 142 which operates a motor valve 144 in product recycle line 146 containing cooler 148 so as to deliver the required amount of cooled hydrogenated product to feed line 104 upstream of pump 150 to maintain the selected hydrogenation temperature in the reactor as determined at the temperature sensing point in line 118. It is also feasible to sense the temperature in line 108 and maintain the temperature control in the same manner, although a different set point on instrument 124 would be required. Product in line 130 not used in the recycle temperature control is withdrawn thru line 151 as product of the process. This stream may be filtered, if necessary, to remove any entrained catalyst, and then distilled to recover the desired product with recycle of diluents, etc. The catalyst can also be recovered and recycled.

A slurry of recycled catalyst in hydrogenated product is passed thru line 152 from the bottom of separator 110 into eductor 106. Any selected proportion of the withdrawn catalyst slurry may be withdrawn thru line 154 and fresh make-up catalyst is added thru line 156 as required.

The following specific example is presented to illustrate one embodiment of the invention and is not to be construed as unnecessarily limiting the same.

EXAMPLE

Operating conditions

Reactor 10:
Pressure, p.s.i.g. _____ 800
Temperature, °F. _____ 165
Separator 64:
Pressure, p.s.i.g. _____ 400
Temperature, °F. _____ 90

| Number | Material | Quantity |
|---|---|---|
| 82 | ε-Aminocapronitrile ethyl alcohol | 100 g.p.h.[1] |
| 60 | Catalyst make-up | 9 lb./H. |
| 46 | Hydrogen make-up | 3,100 s.c.f.h.[2] |
| 74 | Product recycle | 1,000 g.p.h.[3] |
| 42 | Hydrogen recycle | 30,000 s.c.f.h. |
| 54 | Catalyst slurry | 100 g.p.h.[4] |

[1] 60 g.p.h. ε-aminocapronitrile, 40 g.p.h. ethyl alcohol. Feed also contains 2 pounds/hr. NaOH. G.p.h. means gallons per hour.
[2] S.c.f.h. means standard cubic feet per hour. In some processes it may be desirable to add nitrogen in addition to hydrogen.
[3] Recycle comprises hexamethylenediamine, ethyl alcohol, caustic, and some Raney nickel catalyst.
[4] Product with catalyst concentrate. Comprises hexamethylenediamine, ethyl alcohol, caustic, and concentrate of catalyst. The concentration of catalyst is about 15 weight percent in this concentrate.

NOTE.—The amount of (a) recycle product and (b) recycle hydrogen can vary considerably. The range will be for (a) about 1=1 to 20=1 based on feed 82; and for (b) about 5=1 to 40=1 based on hydrogen make-up 46.

Certain modifications of the invention will become apparent to those skilled in the art and the illustrative details disclosed are not to be construed as imposing unnecessary limitations on the invention.

I claim:
1. A catalytic hydrogenation process for producing hexamethylenediamine comprising the steps of:
   (a) feeding streams of an organic liquid selected from the group consisting of adiponitrile and ε-aminocapronitrile; hydrogen; and a slurry of solid particulate hydrogenation catalyst selected from the group consisting of Raney nickel and Raney cobalt in hydrogenated product from the process into the lower portion of an upright reactor so as to maintain a pressure in the range of 40 to 80 atmospheres therein, under a hydrogenation temperature corresponding to said pressure range;
   (b) maintaining a hydrogen vapor phase above and in contact with a liquid phase of hydrogenated liquid reaction product resulting from step (a);
   (c) withdrawing said hydrogenated liquid reaction product from said reactor;
   (d) recovering a slurry of said catalyst in a portion of the hydrogenated liquid product withdrawn from said reactor;
   (e) cooling and recycling the removed slurry of step (d) to a lower section of said reactor;
   (f) passing remaining substantially catalyst-free liquid product through a cooling zone and an expansion zone into a gas-liquid separation zone to recover hydrogen dissolved in said product as an overhead stream and substantially catalyst-free, hydrogen-free liquid product as a bottom stream; removing a portion of said bottoms stream as product;
   (g) extracting a substantial portion of the exothermic heat of the hydrogenation reaction from said reactor by indirect heat exchange with a coolant circulated through a jacket surrounding said reactor; and
   (h) effecting supplemental temperature control of the hydrogenation in said reactor by cooling a substantial proportion of said substantially catalyst-free, substantially hydrogen-free liquid product to a temperature substantially below the hydrogenation temperature, recycling said cooled product to said reactor, sensing the outlet temperature of said hydrogenated liquid product from said reactor, and regulating the flow rate of cooled recycled product to maintain said outlet temperature at the hydrogenation temperature.

2. The process as recited in claim 1 wherein the step of maintaining a hydrogen vapor phase above and in contact with a liquid phase of hydrogenated liquid reaction product includes maintaining said liquid phase at a predetermined level in said reactor by controlling the rate of withdrawal of said product from said reactor, maintaining a hydrogen vapor phase in a zone of said reactor above and in contact with said liquid phase, withdrawing hydrogen from said vapor zone, compressing said withdrawn hydrogen along with additional hydrogen, cooling same, and injecting the cooled hydrogen into a lower portion of said reactor.

References Cited

UNITED STATES PATENTS 2,166,151  7/1939  Howk.
3,056,837  10/1962  Steeman.

CHARLES B. PARKER, Primary Examiner
R. L. RAYMOND, Assistant Examiner

U.S. Cl. X.R.
23—252; 260—690